US006536961B1

(12) United States Patent
Gillies

(10) Patent No.: US 6,536,961 B1
(45) Date of Patent: Mar. 25, 2003

(54) CAMERA SYSTEM

(75) Inventor: Robert M. Gillies, Etobicoke (CA)

(73) Assignee: Raytheon Company, Lexington, MA (US)

( * ) Notice: Subject to any disclaimer, the term of this patent is extended or adjusted under 35 U.S.C. 154(b) by 7 days.

(21) Appl. No.: 09/689,373

(22) Filed: Oct. 12, 2000

(51) Int. Cl.[7] .............................................. G03B 17/00
(52) U.S. Cl. ...................... 396/427; 396/428; 348/143
(58) Field of Search ................................. 396/427, 428, 396/529, 534; 348/143, 147

(56) References Cited

U.S. PATENT DOCUMENTS

| 4,733,257 | A | | 3/1988 | Ziegler ........................ 396/342 |
|---|---|---|---|---|
| 5,105,312 | A | * | 4/1992 | Tiffen et al. ................. 359/892 |
| 5,224,675 | A | * | 7/1993 | Ellenberger et al. ......... 396/427 |
| 5,240,220 | A | * | 8/1993 | Elberbaum ................... 396/427 |
| 5,951,972 | A | * | 9/1999 | Noble et al. ................. 250/330 |
| 6,019,524 | A | * | 2/2000 | Arbuckle ..................... 396/427 |
| 6,033,129 | A | * | 3/2000 | Foye ............................ 396/421 |
| 6,140,941 | A | * | 10/2000 | Dwyer et al. ................ 340/928 |

* cited by examiner

*Primary Examiner*—Christopher Mahoney
(74) *Attorney, Agent, or Firm*—Daly, Crowley & Mofford, LLP

(57) ABSTRACT

A camera system includes a camera module that can be rapidly aligned with a predetermined field of view. In one embodiment, the camera module includes a faceplate that is matable to a mounting bracket so as to place the camera module in a fixed position relative to the mounting bracket. A mounting rail is securable to the face plate, such as perpendicularly. A base plate, to which the camera can be affixed, is engagable to the mounting plate such that that the camera is movable about yaw and pitch axes with respect to the mounting plate. The base plate position can be adjusted by a plurality of screws that impinge upon the mounting plate until the camera optical axis is aligned with the longitudinal axis of the module. Once the camera is aligned it is fixed in position in relation to the mounting plate, and therefore, the faceplate and the mounting bracket as well. This arrangement allows a camera to be rapidly aligned with the predetermined field of view by mounting the camera module on the mounting bracket.

18 Claims, 7 Drawing Sheets

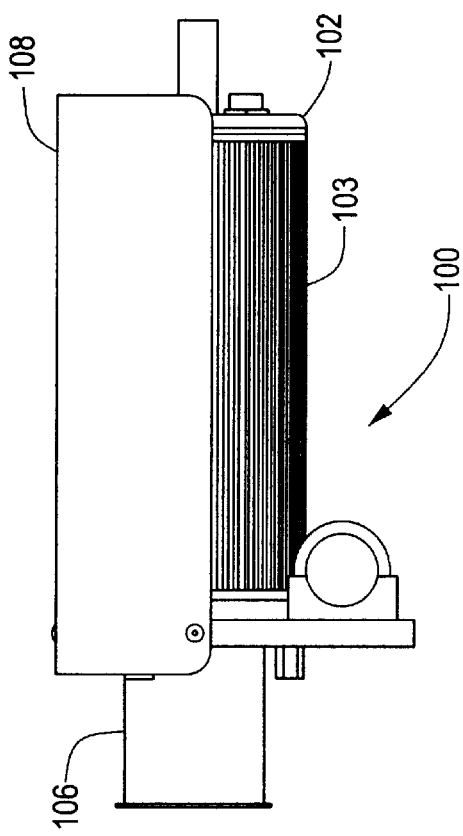
FIG. 1
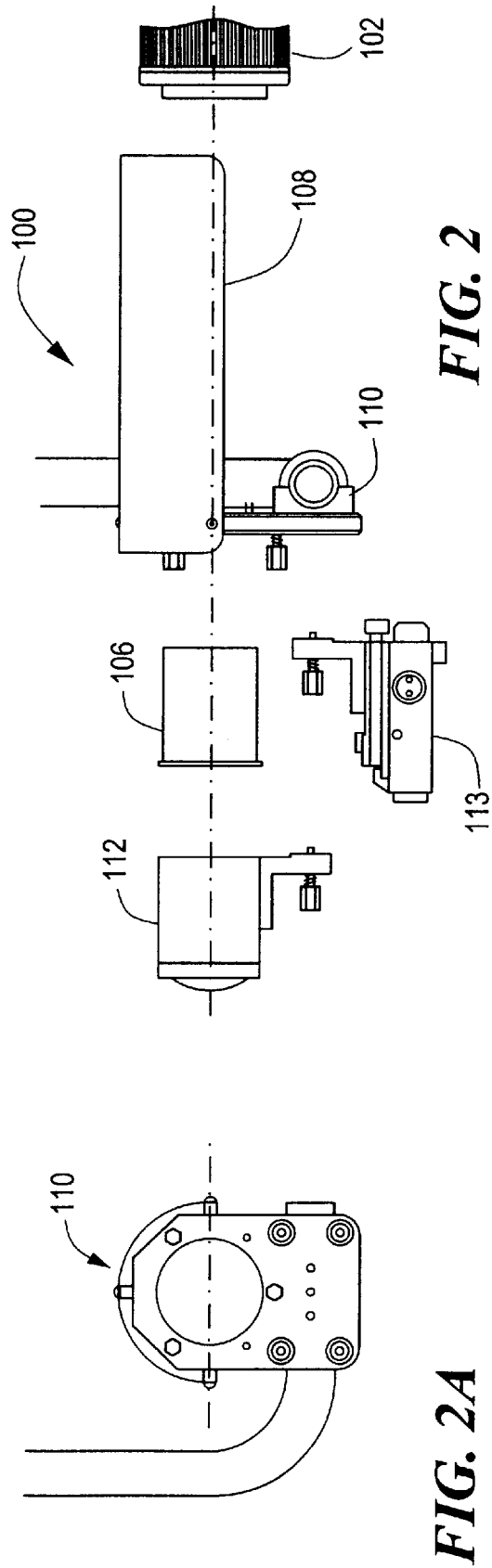
FIG. 2
FIG. 2A

CAMERA SYSTEM

FIELD OF THE INVENTION

The present invention relates generally to camera systems, and more particularly, to a camera system having alignment mechanisms enabling it to image a field of view.

BACKGROUND OF THE INVENTION

Cameras can be used to collect data in a wide variety of applications. For example, a highway toll station can include one or more cameras for obtaining certain vehicle data, such as license plate information from automobiles passing through the toll area. The captured license plate data is submitted to a pattern recognition system for ultimate collection of toll revenue from the vehicle owner. The cameras used in such a system should be sufficiently rugged to withstand harsh environmental conditions and should be impervious to vibration levels generated by cars and trucks passing through the toll station. In addition, the camera should be relatively easy to align with a desired field of view to capture the license plate data.

In general, such cameras are secured to a bracket that has a fixed position on the toll road. The cameras however, must be properly aligned with the highway so as to image the field of view corresponding to a vehicle license plate. Each time the camera is removed from the housing for servicing it must be re-aligned upon its return. Such re-alignment can be a time-consuming process. Since the camera is unable to process license plate data during the time it is offline, toll revenue collection can be significantly reduced.

It would, therefore, be desirable to provide a camera module that can be rapidly aligned with a predetermined field of view.

SUMMARY OF THE INVENTION

The present invention provides a camera system having a camera module for imaging a field a view. The camera module includes a casing and a camera that is collimated with respect to a longitudinal axis of the module. The collimated camera module can be rapidly secured to a mounting bracket, which has a fixed position, such that the camera, upon mounting, is aligned with a predetermined field of view. While the invention is primarily shown and described in conjunction with a highway toll collection system, it will be appreciated that the invention is applicable to other camera systems requiring alignment with a fixed field of view.

In one aspect of the invention, a camera module includes a casing and a camera. The casing that encloses the camera comprises a faceplate that is securable to a mounting bracket for securing the module in a fixed position. A mounting rail extends from the faceplate, which closes one end of the casing. A base plate is movably coupled to the mounting rail such that the base plate is positionable about pitch and yaw axes. The module further includes a camera positioning mechanism for aligning the camera's optical axis with the longitudinal axis of the module housing by adjusting the position of the base plate in relation to the fixed mounting rail and faceplate.

In one embodiment, the camera positioning mechanism includes a pitch adjustment member, such as a screw, that can be rotated to move the base plate and camera with respect to the mounting rail and thereby determine the pitch position of the camera. Left and right pitch/yaw adjustment members can be rotated to move the base plate in relation to the mounting rail and thereby determine the pitch and yaw position of the camera.

In a further aspect of the invention, a camera module includes a camera having an optical axis that is aligned with a longitudinal axis of the camera module. The camera module is readily matable to a mounting bracket, which in the case of being mounted on a toll road, has a known position on the toll road in relation to a predetermined field of view to be imaged by the camera. A faceplate of the camera module is secured to the mounting bracket such that the camera is aligned with the predetermined field of view upon mounting to the mounting bracket.

These and other objects, aspects, features and advantages of the invention will become more apparent from the following drawings, detailed description and claims.

BRIEF DESCRIPTION OF THE DRAWINGS

The invention will be more fully understood from the following detailed description taken in conjunction with the accompanying drawings, in which:

FIG. 1 is a side view of a camera module that can form a part of a camera system in accordance with the present invention;

FIG. 2 is an exploded view of the camera module of FIG. 1;

FIG. 2A is a front view of a mounting bracket to which the camera module of FIG. 1 can be affixed;

DETAILED DESCRIPTION OF THE INVENTION

Figure 3A:
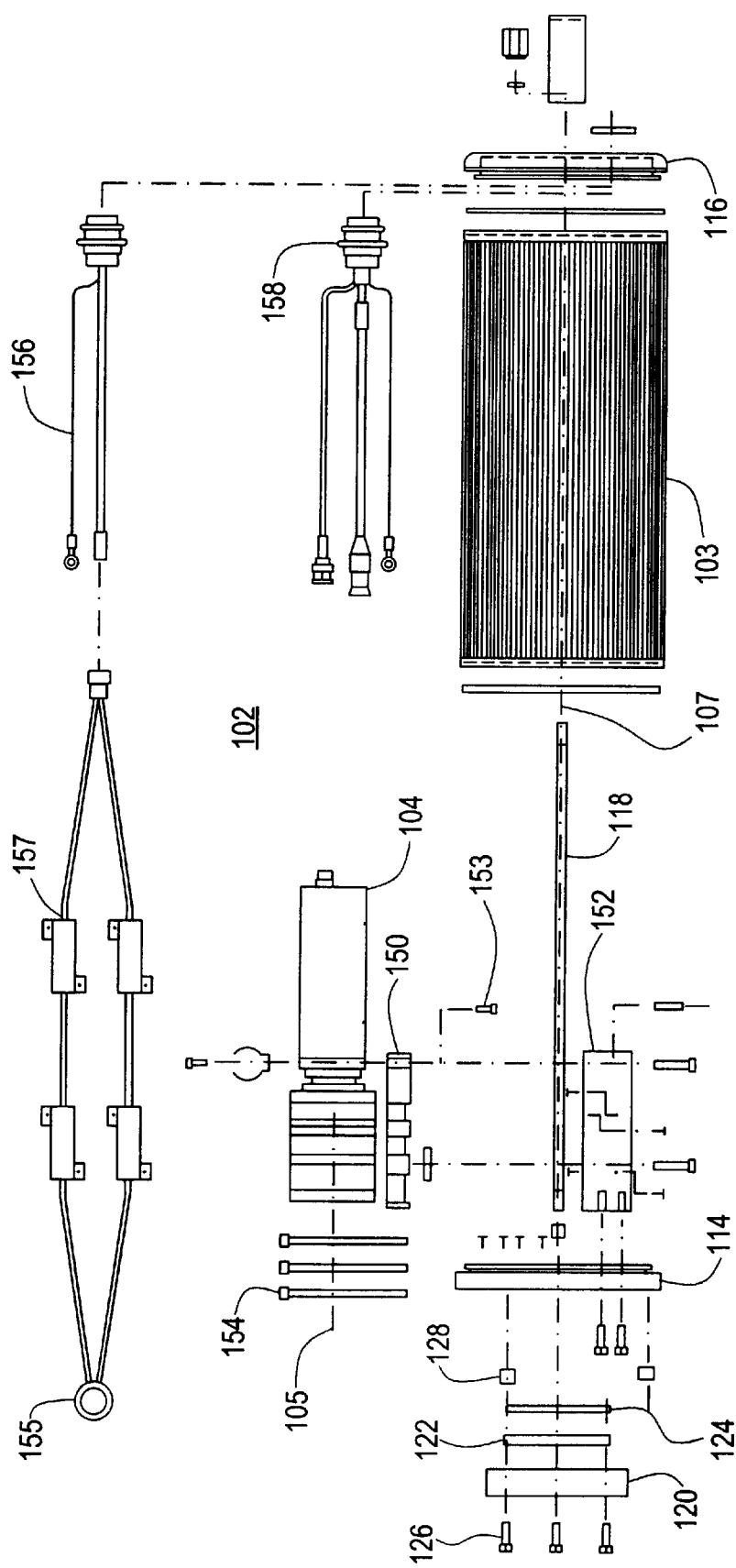
FIG. 3A is an exploded side view of the camera module of FIG. 1.

FIG. 1 shows a side view of a camera module 100 having a camera module 102 in accordance with the present invention that can be rapidly aligned with a predetermined field of view. In one embodiment, the camera images a field of view (FOV) for capturing license plate data from vehicles passing through a highway toll station. The captured license plate data is forwarded to a conventional pattern recognition system to enable ultimate collection of toll revenue. In general, a series of camera systems 100 can be utilized with overlapping fields of view such that at least one camera captures an entire license plate number. For such an array of cameras with overlapping fields of view, each camera must be precisely positioned to capture vehicle data as intended. For example, such a system can require a field of view margin of error of about plus/minus one centimeter relative to a one hundred and eighty centimeter field of view per camera. In addition to field of view overlap, the camera roll angle, i.e. the angle at which the camera must be positioned to maintain a line of sight, should match the cross slope of the road in order for the license plate data to appear as level as possible to enhance conventional pattern recognition operation.

The camera module 102 can include a casing 103 in which a camera 104 (FIG. 3A) is contained. A shroud 106 can be secured to an end of the casing 103 to minimize the accumulation of dirt and grease by creating a region of dead air at the imaging end of the camera module. By reducing the dirt buildup, so-called blooming of the camera is decreased. As known to one of ordinary skill in the art, blooming refers to a condition where excessive light is reflected into the camera lens so as to saturate a CCD camera. The casing 103 can be covered by a hood 108 for further minimizing exposure to the elements.

As shown in FIGS. 2 and 2A, the camera module 102 is matable to a mounting bracket 110, which can have a position in an imaged area, such as a toll road, which is fixed in relation to a predetermined field of view to be imaged by the camera 104. As discussed below, the camera system 100 of the present invention allows rapid alignment with a predetermined field of view by collimating an optical axis of the camera 104 (FIGS. 3A, 3B) with a longitudinal axis 107 of the camera module 102. The pre-positioned mounting bracket 110 thus can receive the collimated camera module 102 such that the camera images a predetermined field of view without further adjustment.

As shown, a focus/collimation tool 112 can be secured to an opposite (accessory) side of the mounting bracket 110 to facilitate collimation of the optical axis 105 of the camera 104 (FIG. 3A) with the camera module 102 longitudinal axis 107, as described below. The mounting bracket 110 receives the camera module 102 so as to position the camera module in a predetermined location in relation to the mounting bracket 110. An alignment tool 113 can be secured to the mounting bracket 110 for spatial positioning of the mounting bracket, as described below. The camera module 102 is then fixed in position with respect to the mounting bracket 110 such that the camera 104 images the predetermined field of view.

Figure 3B:
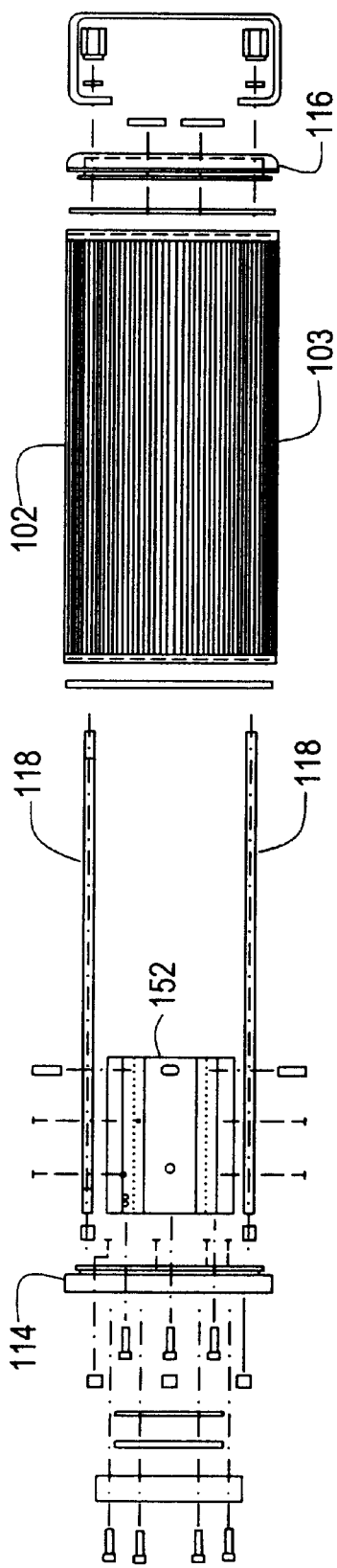
FIG. 3B is an exploded top view of the camera module of FIG. 1.
Figure 4A:
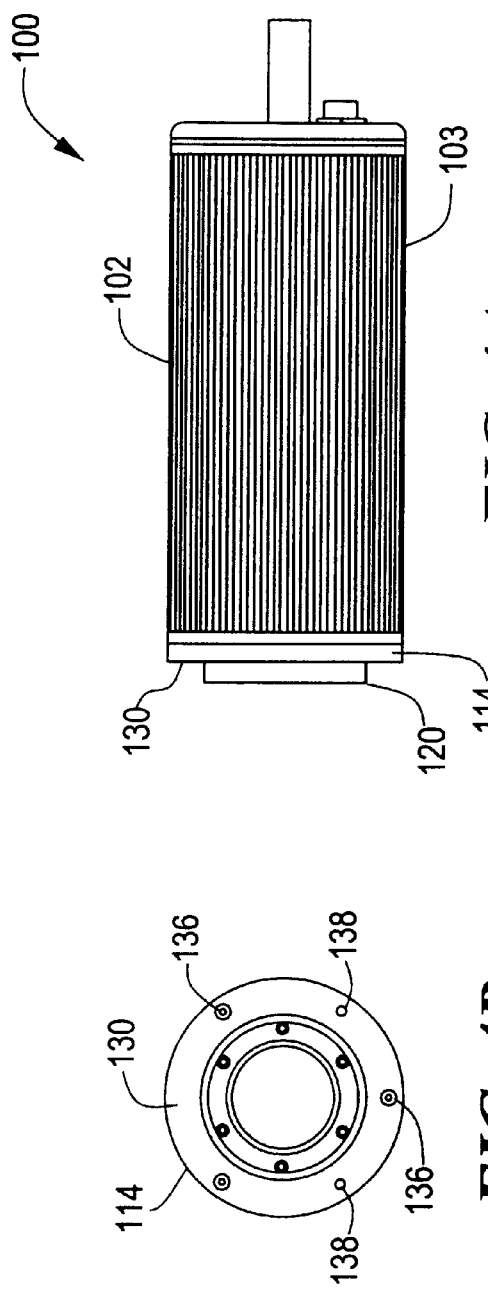
FIG. 4A is a side view showing further details of a camera casing that forms a part of the camera module of FIG. 1.
Figure 4B:
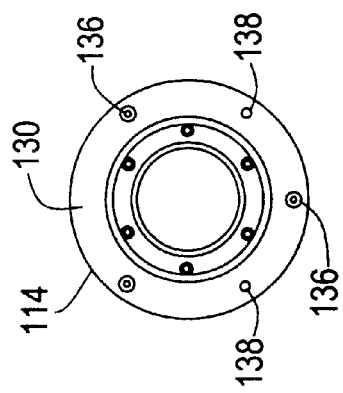
FIG. 4B is a front view of a faceplate that forms a part of the camera module of FIG. 1.
Figure 4C:
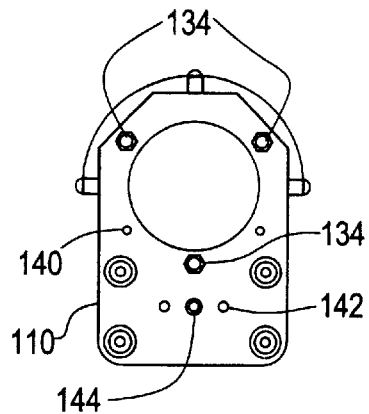
FIG. 4C is a front view of the mounting bracket of FIG. 2A.
Figure 4D:
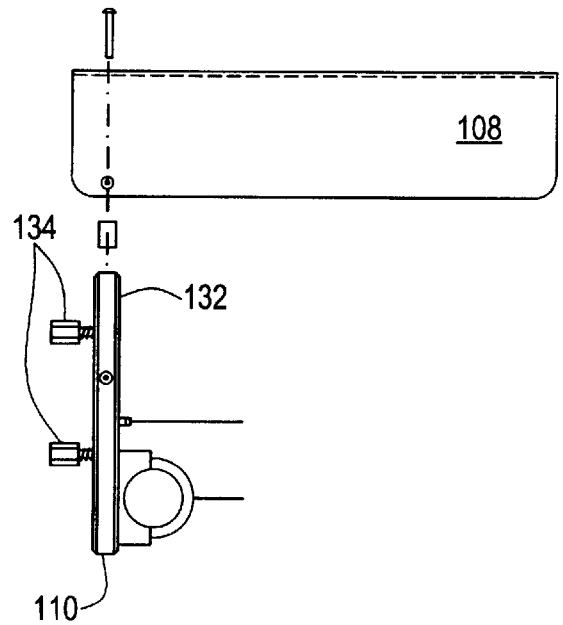
FIG. 4D is a side view of the mounting bracket of FIG. 4C.

FIGS. 3A–B show respective exploded left side and top views of an exemplary camera module in accordance with the present invention, such as the camera module 102 of FIG. 1. As shown, the module 102 has a longitudinal axis 107 to which an optical axis 105 of the camera 104 can be aligned, as described below. The camera 104 is housed within the weather resistant casing 103, which can be closed at a proximal or imaging end by a faceplate 114 and at the distal end by an end plate 116. The faceplate 114 and the end plate 116 can be secured to the casing 103 by tie rods 118 that extend through the casing 103. The faceplate 114 and end plate 116 seal the proximal and distal ends of the casing 103. The faceplate 114 can further include a ring 120 for retaining a window 122 and window gasket 124 to the faceplate 114. In one embodiment, screws 126 are used to secure the window 122 to the faceplate 114.

As shown in FIGS. 4A–D, the face plate 114 can include a mounting indexing surface 130 that mates with a corresponding indexing surface 132 (FIG. 4D) on the mounting bracket 110. The indexing surfaces 130,132 precisely position the faceplate 114 with respect to the mounting bracket 10. In one embodiment, three captive screws 134 and corresponding screw holes 136 secure the faceplate 114 to the mounting bracket 110. This arrangement places the camera module 102 in the same position with respect to the bracket 110 each time the module is mounted on the bracket 110, thus allowing the camera's field of view to be properly aligned.

The face plate 114 can further include insertion members such as, for example, a series of dowel sockets 138 that are insertable into corresponding dowels 140 in the mounting bracket 110 for roll indexing, i.e., matching the roll angle of the mounting bracket 110 with that of the module 102. The mounting plate 110 can also include roll indexing sockets 142 and an attachment point 144 for aligning accessories such as the collimation tool 112, shown in FIG. 1 and described below.

Figure 5:
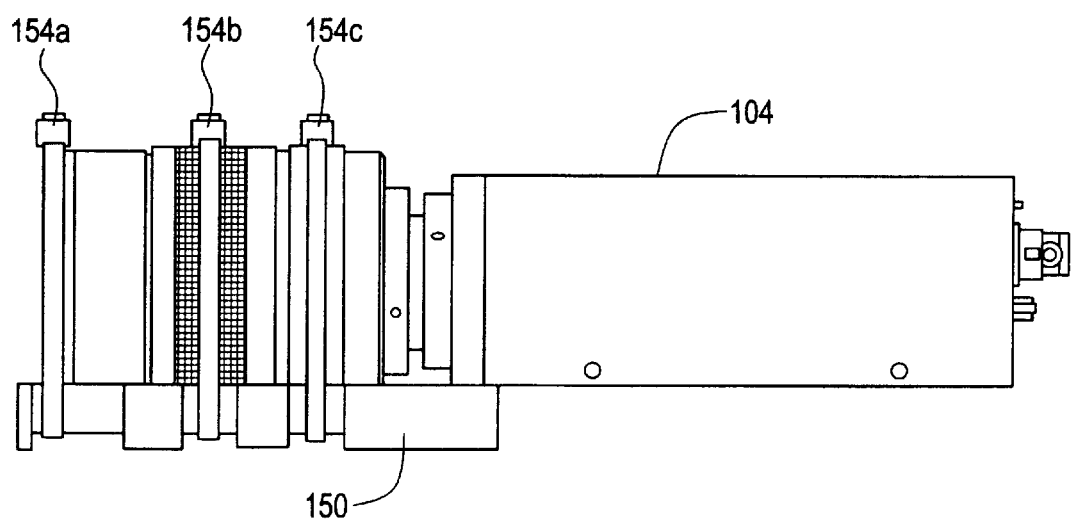
FIG. 5 is a side view of a camera coupled to a base plate that can form a part of the camera module of FIG. 1.

Referring again to FIGS. 3A–B, the camera's 104 longitudinal axis is 105 can be aligned with the longitudinal axis 107 of the module 102 upon securing the camera 104 to a base plate 150. As shown, the base plate is coupled to a mounting rail 152. In one embodiment, the camera 104 is secured to the base plate 150 by several, e.g., two, socket cap screws 153. A series of cable ties 154a,b,c, as shown in FIG. 5, are capable of locking in place various camera settings, such as focus, aperture and filter settings. It is to be appreciated that other securing members known to those in the art can be substituted for the cap screws and cable ties. In the present embodiment, the mounting rail 152 is fixed in position relative to the face plate 114 while the position of the base plate 150, which supports the camera 104, can be manipulated with respect to the mounting rail 152 and face plate 114, as described in detail below. As further shown in FIGS. 3A and 3B, the camera module 102 can further include a thermostat 155, heaters 157 and wiring harness 156 for allowing cold weather operation of the module. As known to one of ordinary skill in the art, the thermostat 155 energizes the heaters 155 during cold weather operation to prevent the formation of external condensation on the window and to maintain the internal module temperature above a minimum temperature. The module can also include a video harness 158 for providing image data to a remote location that can include a conventional pattern recognition system.

Figure 6A:
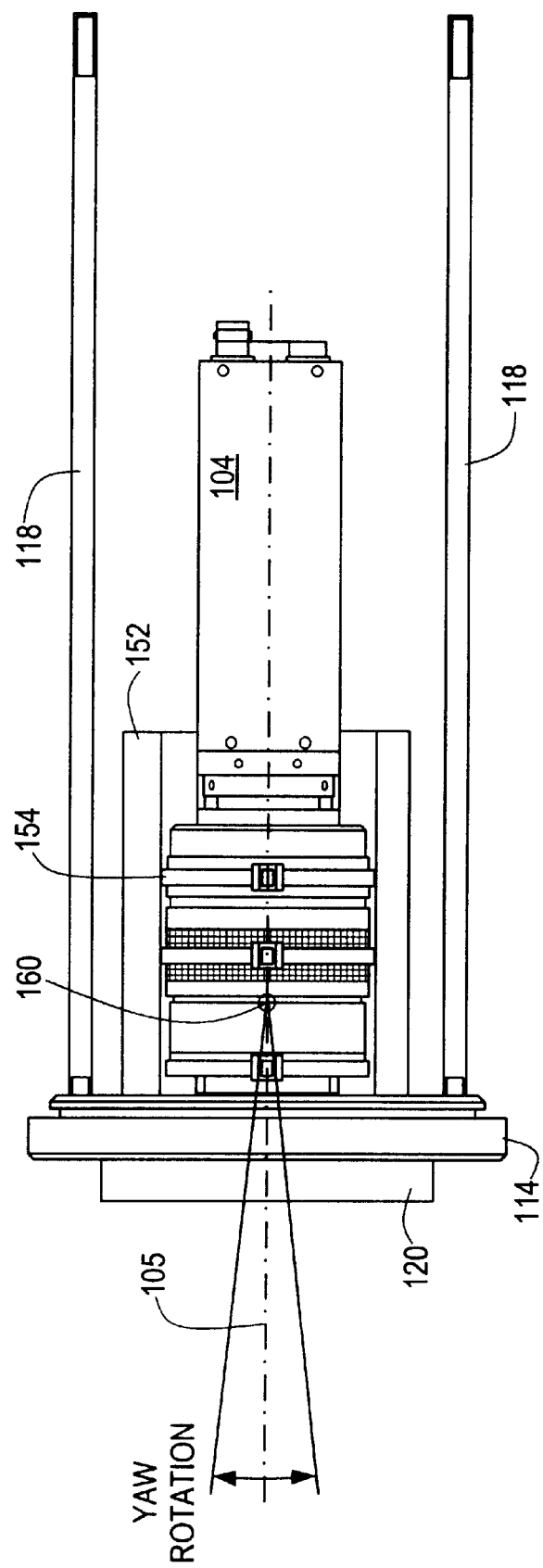
FIG. 6A is a top view of the camera module of FIG. 1 shown without the casing.
Figure 6B:
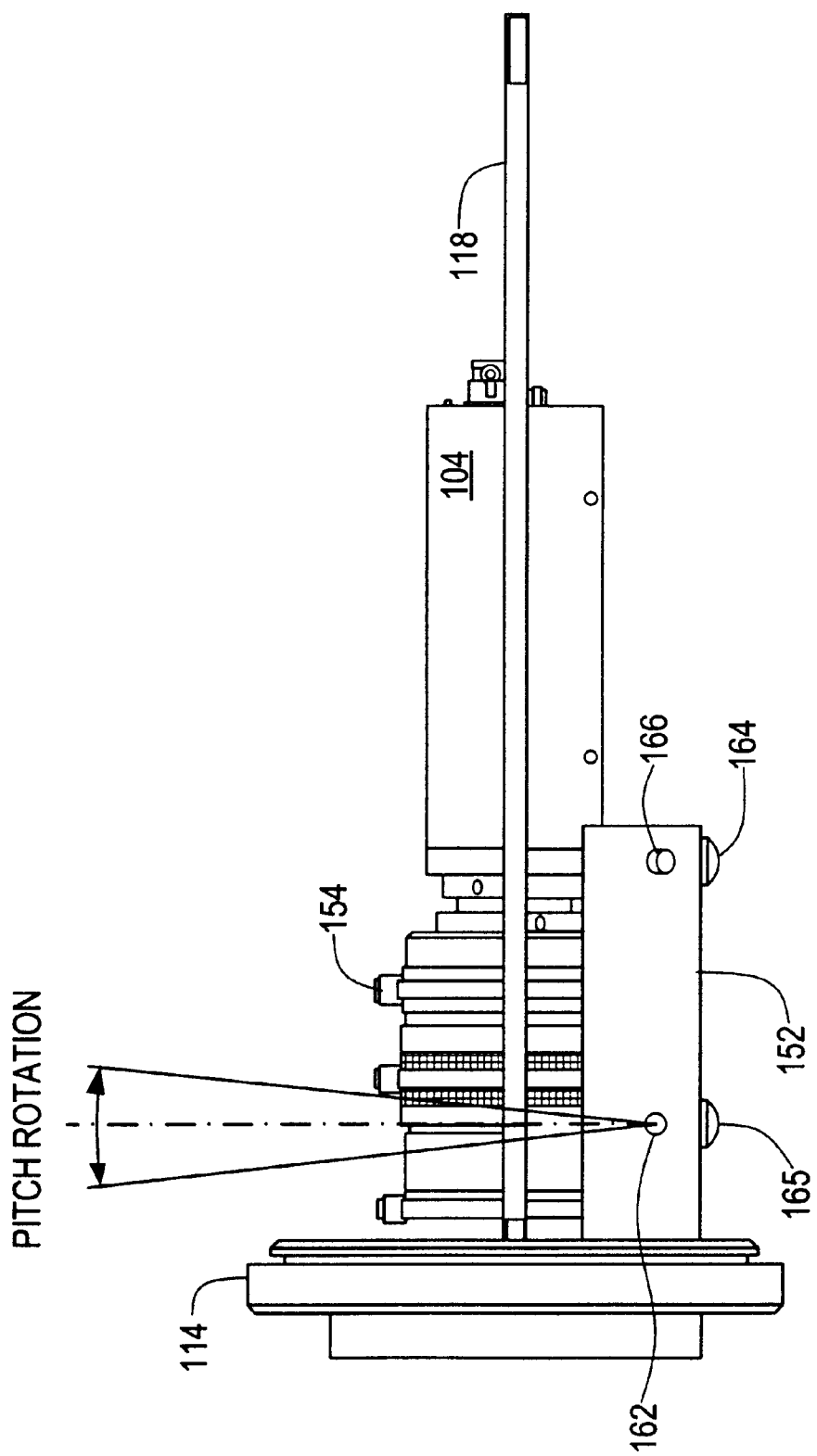
FIG. 6B is a side view of the camera module of FIG. 1 shown without the casing.
Figure 6C:
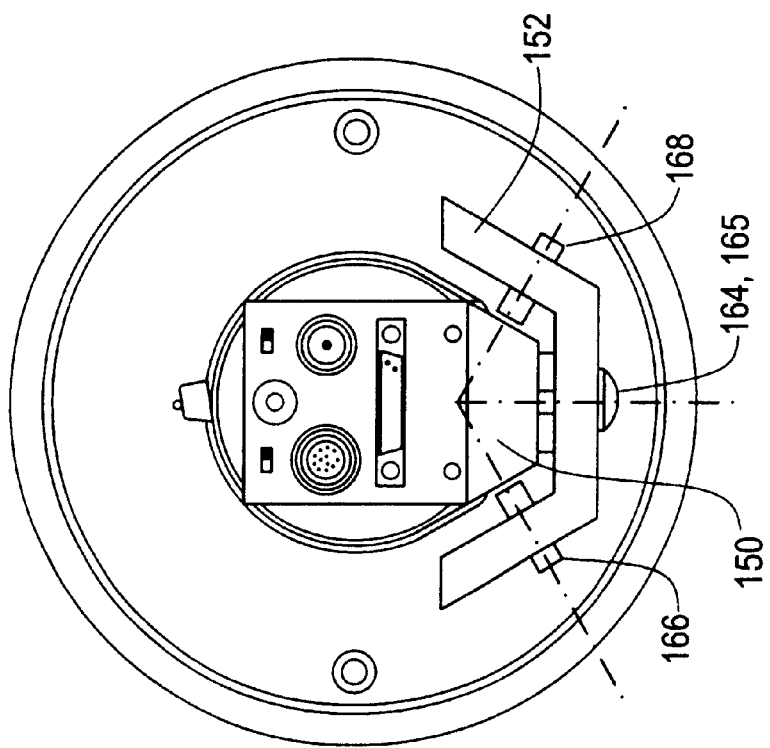
FIG. 6C is an end view of the camera module of FIG. 1 shown without the casing.

Referring to FIGS. 6A–C, the camera 104 is mounted on the base plate 150 with respect to the mounting rail 152 and faceplate 114. In general, the camera position is manipulated to align the optical axis 105 of the camera with the longitudinal axis 107 of the module 102. The camera 104 can then be positioned in yaw by rotation about a yaw axis 160 as shown in FIG. 6A, and in pitch by rotation about a pitch axis 162, as shown in FIG. 6B. In the present embodiment, this rotation can be accomplished by rotating a plurality of screws 164,166,168 to move the base plate 150 in yaw and pitch, and therefore adjust the position of the camera 104, with respect to the mounting rail 152. As a result of such rotation, the camera 104 optical axis 105 is thus collimated with the module longitudinal axis 107. In turn, the collimated camera module 100 can be rapidly mated to a mounting bracket 110 such that the camera 104 images a predetermined field of view without further adjustment.

In one embodiment, a pitch adjusting screw 164 is rotated to displace the base plate 150, to which the camera 104 is affixed, with respect to the mounting rail 152 so as to move the camera up and down about the pitch axis 162. A left yaw/pitch adjusting screw 166 adjusts the camera 104 about the pitch axis 162 and about the yaw axis 160. A right yaw/pitch adjusting screw 168 disposed on an opposite side of the mounting rail 152 also adjusts the camera about the pitch and yaw axes 162,160. In one embodiment, the base plate is anchored to the mounting rail by front pivot screw 165. Once the camera 104 is manipulate to image the desired FOV, the adjusting screws 164,166,168 are locked in position. It is to be appreciated that alternate mechanisms, such as, for example, fastening joints, hinged or reciprocating members, can be used to secure and rotate the base plate 150 about the mounting rail 152.

Prior to receiving a collimated camera module 102, the mounting bracket 110 position is adjusted in pitch, yaw and roll such that the camera 104 images the desired field of view upon mating of the module 100 on the mounting bracket 110. The mounting bracket 110 can be placed at the proper location in space (X,Y,Z coordinates) in a conventional manner.

In one embodiment, an alignment tool 113 can be used to position the mounting bracket 110 and to confirm that the alignment of a mounting bracket is correct. In general, the site is surveyed to determine the coordinates for the field of views to be imaged for optimal license plate data collection, the position of gantries to which the mounting brackets 110 are secured, and the optimal location for left and right reference targets. The alignment tool 113 includes left and right optical or laser pointing devices each of which can be adjusted in yaw and pitch. Based on the coordinates from surveying the site, the proper offsets can be applied to the left and right pointing devices. When the alignment tool 113 is secured to the mounting bracket 110, the proper position of the mounting bracket is achieved when the left and right pointing devices line up with the left and right reference targets. The mounting bracket 110 is then secured in position for receiving collimated camera modules 100.

Figure 7:
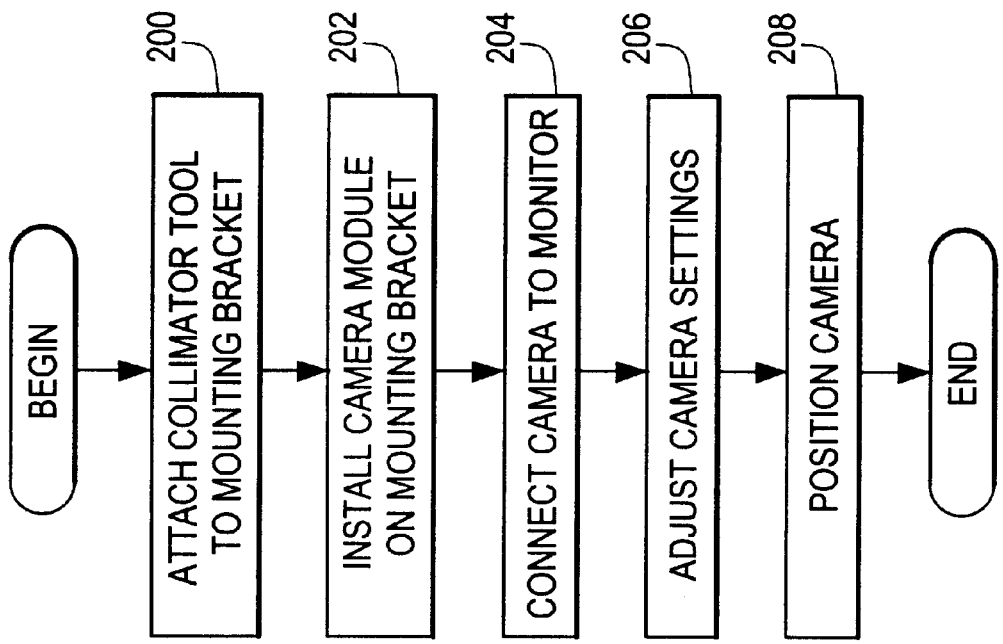
FIG. 7 is a flow diagram showing an exemplary sequence of steps for collimating a camera module in accordance with the present invention.

FIG. 7, in combination with FIGS. 3A–6C, show an exemplary sequence of steps for initially collimating a camera module 102, such that the camera module can be mounted to a mounting bracket 110 to enable the camera 104 to image a predetermined field of view. In the present embodiment, the mounting bracket 110 can be at the toll station site, with the desired field of view being the area on the highway where a license plate can be imaged from the position of the mounting bracket 110.

In step 200, an operator attaches a collimator tool 112 to the accessory side of the mounting bracket 110. Due to the indexed surface of the faceplate, the collimator tool 112 is located in a known position in relation to the module optical axis. The collimator tool 112 simulates the path of light reflected from a target centered and orthogonal to the mounting bracket 110 at a predetermined distance, e.g., fifty feet, from the camera focal plane. With this arrangement, an image viewed by a camera module 102 installed on the mounting bracket appears focused and centered when the camera is focused to the selected distance (fifty feet) and the camera optical axis 105 is centered and parallel to the mounting bracket optical axis. The collimator tool 112 can further include a polarizer that produces the brightest image when the camera lens polarizer minimizes glare.

In step 202, the camera module 102, with the casing 103 removed, is mated to the mounting bracket 110 by securing the module faceplate 114 to the indexing surface 132 of the mounting bracket. In step 204, the camera 104 is connected to a monitor that displays the image from the camera. In step 206, the camera settings are adjusted such that the lens aperture is set to the maximum "f" stop and the lens polarizing filter is adjusted to find to the maximum brightness on the monitor which correspond to a predetermined distance, e.g., fifty feet. The focus can then be adjusted for maximum sharpness of the field of view reticle and displacement reticle on the monitor. It is understood that the field of view reticle and displacement reticle are visual indicators that appear in focus on the monitor when the camera is properly focused. After adjustment, the camera settings can be locked in position by the cable ties.

In step 208, the camera positioning mechanism screws are adjusted to align the optical axis 105 of the camera 104 with the longitudinal axis 107 of the camera module 100. More particularly, the field of view reticle and the displacement reticle are made concentric on the monitor by adjusting the camera in pitch and yaw via the camera positioning mechanism. In step 210, the monitor is disconnected and the casing is re-installed.

In an alternative embodiment, the camera 104 is collimated with the camera module 102 using a collimator tool located at a predetermined distance. For example, the collimator tool is placed about four feet from a 75 millimeter lens. The camera position is manipulated until the camera optical axis 105 is aligned with the camera module optical axis 107. The camera is then focused to the desired distance, e.g., fifty feet.

In a further embodiment, the camera is collimated with the camera module without a collimator tool. In general, a camera module is secured to a mounting bracket having a fixed position. A target having a known reference position is used for positioning and focusing the camera. The camera focus and aperture settings can be adjusted to obtain the optimal image of the target. The camera position is then manipulated to center a cross hair on the monitor in a conventional manner.

Once a camera module 102 is collimated with an exemplary mounting bracket 110, the camera module 102 can be removed from the mounting bracket 110 and installed on other similarly disposed mounting brackets. The position of the mounting bracket 110 can be further be adjusted until the camera images a predetermined field of view. Thereafter, a collimated camera module 102 can be installed on a positioned mounting bracket 110 relatively quickly, e.g., about two minutes. In contrast to conventional systems that require camera collimation each time a camera is mounted to a mounting member, this arrangement allows camera modules 102 to be rapidly replaced and aligned thereby reducing the amount of lost toll revenue.

Moreover, the shroud on the image-receiving end of the camera module creates a dead air space that reduces the build up of dirt, oil and salt on the module window. By reducing dirt accumulation, blooming is decreased so as to enhance the ability of the system to collect accurate data. Further, the sealed module arrangement, combined with the rapid alignment feature, minimize the time that the camera is exposed to the elements.

One skilled in the art will appreciate further features and advantages of the invention based on the above-described embodiments. Accordingly, the invention is not to be limited by what has been particularly shown and described except as indicated by the appended claims. All publications and references cited herein are expressly incorporated herein by reference in their entirety.

What is claimed is:

1. A camera module having a longitudinal axis, comprising:
   a faceplate for securing the module in a fixed position relative to a mounting bracket;
   a mounting rail secured to the face plate;
   a base plate movably coupled to the mounting rail for aligning an optical axis of a camera mounted on the base plate with the longitudinal axis of the camera module, the base plate being adjustable about a pitch axis and about a yaw axis with respect to the mounting rail.

2. The module according to claim 1, wherein the mounting rail extends from the faceplate substantially perpendicularly.

3. The module according to claim 1, wherein the faceplate includes an indexing surface for mating with a corresponding surface on the mounting bracket to position the faceplate in a predetermined position in relation to the mounting bracket.

4. The module according to claim 1, further including a casing for housing the camera.

5. The module according to claim 1, further including an end plate for mating to an end of the casing.

6. The module according to claim 1, further including a shroud for mating to an imaging end of the camera module to reduce dirt accumulation.

7. The module according to claim 1, further including a hood covering the casing.

8. The module according to claim 1, further including a first adjusting member secured to the mounting rail for moving the base plate about pitch and yaw axes.

9. The module according to claim 8, further including a second adjusting member secured to the mounting rail for moving the base plate about the pitch and yaw axes.

10. The module according to claim 9, further including a third adjusting member secured to the mounting rail for moving the base plate about the pitch axis.

11. A camera system, comprising:
    a mounting bracket having opposing first and second surfaces;
    a camera module for mounting to the mounting bracket, the camera module having a longitudinal axis, the camera module including
       a face plate having opposing first and second surfaces, the first surface of the faceplate being matable with the second surface of the mounting bracket;
       a casing having proximal and distal ends, the proximal end being matable with the second surface of the faceplate;
       a mounting rail extending from the second surface of the faceplate, such that a position of the mounting rail is fixed with respect to the faceplate and the mounting bracket;
    a baseplate movably secured to the mounting rail;
    a camera secured to the baseplate and having an optical axis; and
    a camera positioning mechanism for manipulating the camera about pitch and yaw axes to align the camera optical axis with the longitudinal axis of the camera module.

12. The system according to claim 11, wherein the camera positioning mechanism includes a first member engaged to the mounting for impinging on the base plate to move the camera about the pitch axis.

13. The system according to claim 12, wherein the camera positioning mechanism further includes second and third members engaged to opposing sides of the mounting rail for impinging on the base plate to move the camera about the pitch and yaw axes.

14. The system according to claim 11, further including a collimating/focusing tool coupled to the mounting bracket.

15. The system according to claim 11, wherein the camera system forms a part of a highway tolling system and the camera images license plates.

16. A method of aligning a camera module with a predetermined field of view, comprising:
    mounting a camera on a base plate;
    movably coupling the base plate to a mounting rail;
    securing the mounting rail to a face plate;
    securing a collimating/focusing tool to a first surface of a mounting bracket;
    securing the camera module to a mounting bracket;
    connecting the camera to a monitor;
    adjusting settings of the camera for optimal polarization and imaging of a remote target;
    adjusting a camera position mechanism until an optical axis of the camera is aligned with a longitudinal axis of the camera module;
    fixing the camera settings; and
    fixing the camera position mechanism to maintain the position of the camera.

17. The method according to claim 16, further including
    removing the camera module from the mounting bracket; and
    attaching a further collimated camera module to the mounting bracket.

18. The method according to claim 16, further including
    removing the camera module from the mounting bracket;
    installing the camera module on a further mounting bracket; and
    adjusting a position of the further mounting bracket until the camera module images a predetermined field of view.

* * * * *

UNITED STATES PATENT AND TRADEMARK OFFICE
CERTIFICATE OF CORRECTION

PATENT NO. : 6,536,961 B1 Page 1 of 1
APPLICATION NO. : 09/689373
DATED : March 25, 2003
INVENTOR(S) : Robert M. Gillies It is certified that error appears in the above-identified patent and that said Letters Patent is hereby corrected as shown below:

Abstract   line 8   delete "..plate such that that.." and replace with --..plate such that...--.

Column 4, line 4 delete "10." and replace with --110.--.

Column 4, line 21 delete "axis is 105" and replace with --axis 105--.

Column 5, line 7 delete "...is manipulate..." and replace with --...is manipulated--.

Column 6, line 43 delete "...further be adjusted.." and replace with
--...further adjusted--.

Column 6, line 59 delete "...minimize the time.." and replace with
--..minimizes the time...--.

Signed and Sealed this

Twenty-ninth Day of August, 2006

JON W. DUDAS
*Director of the United States Patent and Trademark Office*